UNITED STATES PATENT OFFICE.

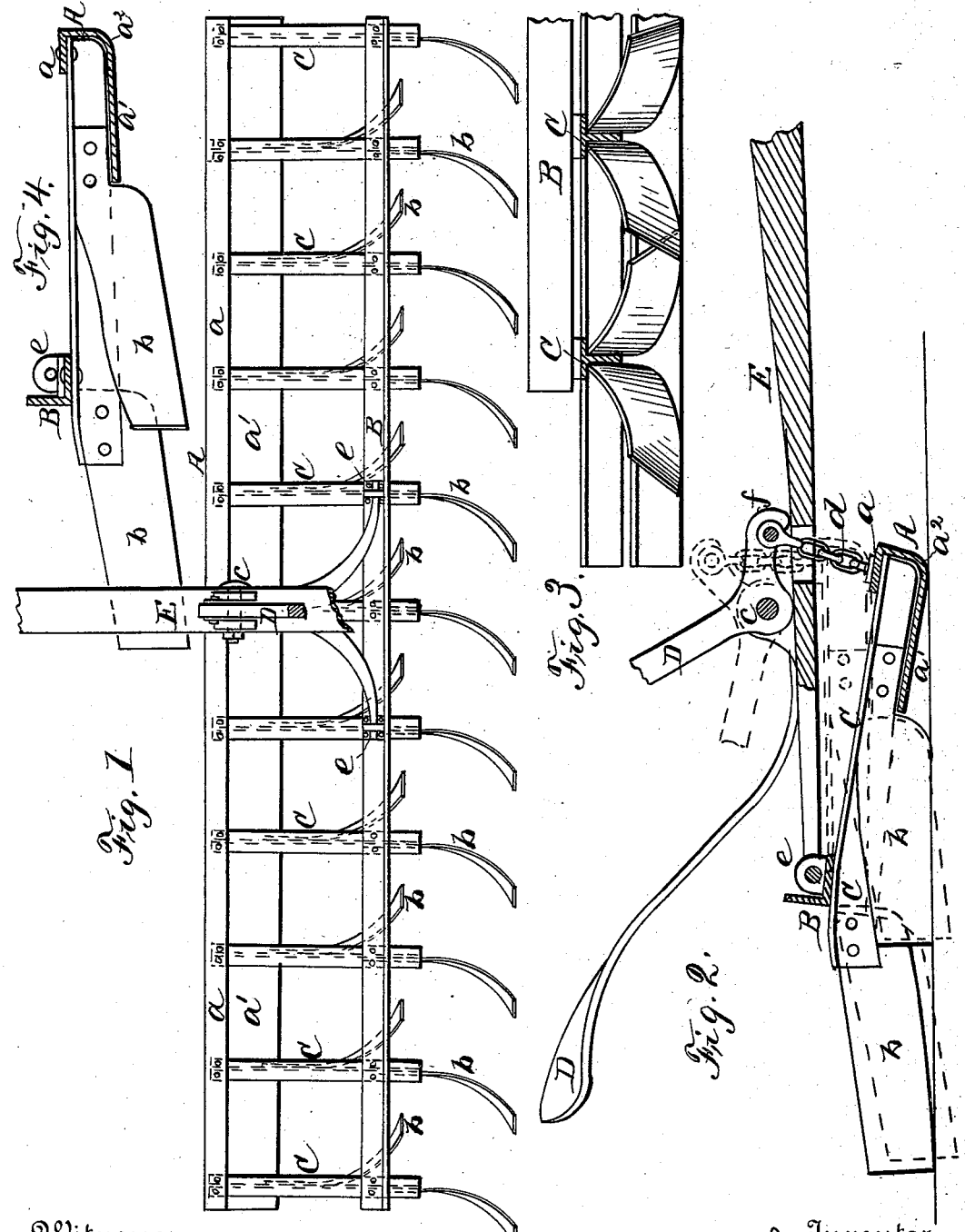

JAMES T. LEIGHTON, OF NEW HAVEN, CONNECTICUT.

HARROW AND CLOD-CRUSHER.

SPECIFICATION forming part of Letters Patent No. 378,011, dated February 14, 1888.

Application filed July 7, 1887. Serial No. 243,679. (No model.)

*To all whom it may concern:*

Be it known that I, JAMES T. LEIGHTON, a citizen of the United States, residing at New Haven, in the county of New Haven and State of Connecticut, have invented new and useful Improvements in Harrows and Clod-Crushers, of which the following is a specification.

I have produced an improved agricultural machine for leveling and smoothing ground, in which two parallel transverse bars are connected by parallel cross-ties to form a single rigid gang-frame in which the cross-ties carry curved trailing or dragging blades, the rear transverse gang-bar having the pivot-connection for the tongue, the front transverse bar forming a shoe-bar for smoothing and breaking up clods, while the hinged tongue carries by direct pivot-connection a lever having a chain or link connection direct with the front shoe-bar, and also carries the driver's seat. As the tongue is pivoted to the rear gang-bar of this rigid frame and has a fixed relation to the team, the tendency of the draft is to constantly depress the front shoe-bar by a positive action, because the latter rides upon the ground some distance in advance of the pivot-connection of the tongue, and it is this arrangement that greatly increases the capacity of the machine for smoothing down minor irregularities of the surface, which facility is due to the pressure given the rigid frame by reason of having a free connection at its front end with the tongue.

The transverse bars and the ties of the frame I prefer to make of angle-iron, and to rivet them together to obtain strength, stiffness, and cheapness of construction. The tie-bars are of T shape in cross-section, so that the vertical web part gives a convenient riveting-surface on two sides for the curved trailing blades and affords an effective support for them in their function of smoothing and leveling the ground to prepare it for the reception of the seed, or to cultivate it and turn the seed under the soil when scattered broadcast.

Provision is made for raising the shoe-bar clear of the ground when desired, while by reason of its free front connection with the tongue, by means of the lever and the pivot-connection of the shoe-bar frame with the tongue, the shoe-bar is free to rise and fall without affecting the relation of the trailing blades to the ground.

Referring to the drawings, Figure 1 is a top view of my improved machine. Fig. 2 is a vertical sectional view, and Fig. 3 is a rear view of a portion of the machine. Fig. 4 shows the shoe and the drag-bar.

The drawings illustrate certain novel features and organization, which will hereinafter be described and claimed.

The front crushing and leveler shoe-bar, A, is made of flat metal having its top edge folded over the shoe part, forming the overhanging ledge $a$, which is parallel with the shoe or crushing portion $a'$, the lower front corner being curved in cross-section and forming the rounding nose $a^2$, which bears upon the ground, and is best adapted for leveling the soil and crushing the clods. The rear metal gang-bar, B, is L-shaped in cross-section, and is arranged in the rear of and parallel with the leveler shoe-bar, and is connected with it by tie-bars C, which hold and carry the gang of earth-treating blades at fixed relative distances apart and constitute, with the front and rear bars, a single frame.

The leveler and gang-bars may be of any desired length corresponding with the sweep or swath to be treated at one traverse of the implement.

The tie-bars C are of angle-iron, T shape in cross-section, having their front ends fitted within the space between the ledge $a$ and body $a'$ of the leveler shoe-bar A, and are riveted to the under side of the ledge, the rear portions of the tie-bars being riveted to the under side of the gang-bar B, and their webs or fins extend downward in vertical lines, and have the earth-treating devices secured thereto on each side and at different points in their length, as shown more clearly in Figs. 1 and 2.

The earth-treating devices are preferably spring blades or teeth $b$, and are arranged in series of two gangs. The one series composing a gang is arranged in advance of and curves laterally in an opposite direction to the series of teeth of the rear gang, thereby covering the entire space equal to the length of the leveler and gang-bars.

The draft-pole E is pivotally connected with the gang-bar by eye-clips $e$, fitted over the pivot-arms of the pole and fastened to the gang-bar. The bell-crank lever D is pivoted upon the pole, and its crank end is connected with the leveler-bar by the chain d, so that the lever extends within convenient reach of the driver, and is held down to raise the shoe-bar by his foot or any well-known means which may be provided for the purpose.

As shown, the lever is pivoted at c to the tongue just above the shoe-bar, and the chain d connects the latter with the short arm f of the lever, which arm stands toward the front, the chain passing up through an opening in the tongue, which is pivoted to the rear angle-bar at the middle of its length.

As the frame stands beneath the tongue and the latter has a hinge-connection with the rear gang-bar of the frame, the shoe part of the latter is free to rise and fall between the ground and the tongue when the lever is raised in vertical position, and when the lever is depressed the shoe part of the frame is elevated from the ground.

The cultivator blades or shares have their straight flat parts riveted to the opposite sides of the vertical web part of the tie-bars, while from such web-connection they curve laterally in separate rows, one row extending beyond the rear ends of the tie-bars, and the other row extending outward from one side under the rear transverse angle-bar, each blade terminating in a flat or horizontal twist, so as to slightly turn the soil as it leaves it.

The lower or cutting edge of each blade is slightly curved like a rocker and cuts into the ground, so that each blade has a cutting and a smoothing action. The rear gang of blades are riveted to the rear ends of the tie-bars, and the forward gang of blades are riveted to said bars near their shoe-bar connected ends, such riveting being upon the opposite sides of the tie-bar web, while the top flange of the tie-bars affords a riveting-surface for the shoe and gang bars. This construction gives the advantage of riveting the blades to the tie-bars and riveting the latter to the transverse frame-bars, which construction requires no screw-bolts and nuts, and gives firm bracing-seats to the blades upon the angle-ties. When the shoe-bar is riding upon the surface, the whole length of the cutting-edges of the two sets of blades is in the ground; but when the shoe-bar is raised the heel part only of the blades is in the ground, and has more of a riding action upon its surface.

While the frame tends by gravity to keep its front shoe-bar upon the ground the draft of the tongue tends, by a downward impulse, to press the shoe-bar down to more effective work.

The driver's seat D is supported upon the tongue in position over the cultivating-blades, so that the weight of the driver tends to keep them in the soil and exerts no direct pressure upon the front crushing-bar; but as a compensation for this the draft of the tongue is caused to pull the front part of the rigid frame and the shoe-beam carried thereby constantly down upon the ground, and to maintain thereby a considerable pressure upon the shoe-beam.

I claim—

1. The combination, with the leveler-bar and the gang-bar, of the series of tie-bars uniting the two bars, and the earth-treating devices secured to each side of said tie-bars, substantially as described, for the purpose specified.

2. The combination, with the leveler-bar composed of a flat piece of metal having its upper front part folded over, forming the ledge $a$, the body $a'$, and the round nose $a^2$, and the gang-bar, of the tie-bars having their front ends fitted in between the ledge and body portions of the leveler-bar and secured at their rear ends to the gang-bar, and the earth-treating devices carried by said tie-bars, substantially as set forth.

3. The combination, with the leveler-bar, the gang-bar, and the tie-bars carrying the earth-treating devices, uniting the two bars, of the draft-tongue pivotally connected with the gang-bar, and provisions, substantially as described, adjustably connecting the tongue and the leveler-bar, substantially as and for the purpose described.

4. The combination, with the leveler-bar, the gang-bar, and the tie-bars carrying the earth-treating devices, of the draft-tongue pivotally connected with the gang-bar, the bell-crank lever mounted upon the draft-frame, and the chain-connections interposed between and connecting the lever with the leveler-bar, substantially as set forth.

5. The combination of a frame composed of a front and a rear transverse bar and tie-bars uniting the said front and rear bars, and a series of trailing blades or teeth carried in pairs on the opposite sides of said tie-bars, one in advance of the other, and a lever carried by said tongue having a free connection with said front bar and a pivoted connection with said rear bar, substantially as described.

6. The harrow-frame composed of the front shoe-bar, A, of angle-iron having the overturned top ledge, $a$, the rear angle-bar, B, and the angle tie-bars C, riveted together, the trailing harrow-blades riveted to the opposite sides of a web of said tie-bars, one in advance of the other and curving laterally in opposite directions, in combination with a tongue pivoted to the rear angle-bar, and a lever carried by said tongue having flexible connection with the shoe-bar, substantially as described.

7. The combination, substantially as set forth, of the tongue, a frame having its rear gang-bar hinged to the rear end of said tongue, and a front shoe-bar having a free connection with said tongue in front of its hinge, so as to rise and fall independently of and beneath said tongue, the tie-bars uniting the said shoe-bar with the rear gang-bar beneath said tongue and carrying the trailing blades, and a lever carried by and above said tongue having a chain-connection with the shoe-bar, substantially as described.

8. The combination, substantially as hereinbefore set forth, of the leveler or clod-crusher, the rear angle-bar, and the tie-bars having the cultivating devices and forming a single rigid frame, the tongue hinged to the rear gang-bar, a lever having a free connection with the shoe-beam, and the driver's seat mounted upon the hinged tongue, whereby the weight of the driver is transferred from the leveler-beam to the rear part of the rigid frame and its cultivating devices.

JAMES T. LEIGHTON.

Witnesses:
 HENRY ROGERS,
 JOHN H. WHITING.